United States Patent
Hadley

(10) Patent No.: US 9,418,027 B2
(45) Date of Patent: Aug. 16, 2016

(54) SECURE BOOT INFORMATION WITH VALIDATION CONTROL DATA SPECIFYING A VALIDATION TECHNIQUE

(75) Inventor: Ted A Hadley, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/233,334

(22) PCT Filed: Mar. 30, 2012

(86) PCT No.: PCT/US2012/031542
§ 371 (c)(1),
(2), (4) Date: Jan. 16, 2014

(87) PCT Pub. No.: WO2013/012461
PCT Pub. Date: Jan. 24, 2013

(65) Prior Publication Data
US 2014/0189340 A1    Jul. 3, 2014

Related U.S. Application Data

(60) Provisional application No. 61/509,078, filed on Jul. 18, 2011.

(51) Int. Cl.
*G06F 21/78* (2013.01)
*G06F 13/16* (2006.01)
(Continued)

(52) U.S. Cl.
CPC .............. *G06F 13/1642* (2013.01); *G06F 1/24* (2013.01); *G06F 11/2284* (2013.01); *G06F 12/1433* (2013.01); *G06F 12/1483* (2013.01); *G06F 13/1663* (2013.01); *G06F 21/54* (2013.01); *G06F 21/55* (2013.01); *G06F 21/57* (2013.01);
(Continued)

(58) Field of Classification Search
CPC ....................................................... G06F 21/78
USPC .......................................................... 713/189
See application file for complete search history.

(56) References Cited

U.S. PATENT DOCUMENTS 3,183,498 A    5/1965    Howe et al.
4,424,561 A    1/1984    Stanley et al.
(Continued)

FOREIGN PATENT DOCUMENTS

CN    1650183 A    8/2005
CN    1820235 A    8/2006
(Continued)

OTHER PUBLICATIONS

"ARM Security Technology Budding a Secure System Using TrustZone® Technology", < http://infocenter.arm.com/help/topic/com.arm.doc.prd29-genc-009492c/PRD29-GENC-009492C_trustzone_security_whitepaper.pdf > Issue: C, 2009.
(Continued)

*Primary Examiner* — William Powers
(74) *Attorney, Agent, or Firm* — Hewlett Packard Enterprise Patent Department

(57) ABSTRACT

Examples disclosed herein relate to secure boot information with validation control data specifying a validation technique. Examples include determining, with the specified validation technique, whether validation data is consistent with the secure boot information.

15 Claims, 5 Drawing Sheets

(51) Int. Cl.

| | | |
|---|---|---|
| H04L 9/32 | (2006.01) | |
| G06F 21/54 | (2013.01) | |
| G06F 21/75 | (2013.01) | |
| H04L 9/08 | (2006.01) | |
| G06F 1/24 | (2006.01) | |
| G06F 21/57 | (2013.01) | |
| G06F 12/14 | (2006.01) | |
| G06F 21/60 | (2013.01) | |
| G06F 21/55 | (2013.01) | |
| G06F 21/72 | (2013.01) | |
| G06F 21/79 | (2013.01) | |
| G09C 1/00 | (2006.01) | |
| G06F 11/22 | (2006.01) | |
| G06F 21/74 | (2013.01) | |
| G01R 31/317 | (2006.01) | |

(52) U.S. Cl.
CPC ............ *G06F 21/575* (2013.01); *G06F 21/602* (2013.01); *G06F 21/72* (2013.01); *G06F 21/74* (2013.01); *G06F 21/75* (2013.01); *G06F 21/78* (2013.01); *G06F 21/79* (2013.01); *G09C 1/00* (2013.01); *H04L 9/088* (2013.01); *H04L 9/0816* (2013.01); *H04L 9/32* (2013.01); *G01R 31/31719* (2013.01); *G06F 2221/2143* (2013.01); *H04L 2209/12* (2013.01)

(56) References Cited

U.S. PATENT DOCUMENTS

| | | | |
|---|---|---|---|
| 5,131,040 A | | 7/1992 | Knapczyk |
| 5,214,760 A | | 5/1993 | Hammond et al. |
| 5,249,286 A | | 9/1993 | Alpert et al. |
| 5,379,378 A | | 1/1995 | Peters et al. |
| 5,406,630 A | | 4/1995 | Piosenka et al. |
| 5,450,082 A | | 9/1995 | Finley et al. |
| 5,469,564 A | | 11/1995 | Junya |
| 5,497,497 A | | 3/1996 | Miller et al. |
| 5,568,529 A | | 10/1996 | Masuda |
| 5,600,576 A | | 2/1997 | Broadwater et al. |
| 5,682,328 A | | 10/1997 | Roeber et al. |
| 5,825,878 A | | 10/1998 | Takahashi et al. |
| 5,872,967 A | | 2/1999 | DeRoo et al. |
| 5,937,063 A | | 8/1999 | Davis |
| 5,987,557 A | | 11/1999 | Ebrahim et al. |
| 6,078,873 A | | 6/2000 | Shutty et al. |
| 6,148,362 A | | 11/2000 | Sagi |
| 6,188,603 B1 | | 2/2001 | Takada |
| 6,243,812 B1 | | 6/2001 | Matyas |
| 6,292,898 B1 | | 9/2001 | Sutherland |
| 6,377,691 B1 | | 4/2002 | Swift et al. |
| 6,378,072 B1 | | 4/2002 | Collins et al. |
| 6,424,143 B1 | | 7/2002 | Blossfeld et al. |
| 6,463,535 B1 * | | 10/2002 | Drews .......................... 713/176 |
| 6,466,048 B1 | | 10/2002 | Goodman |
| 6,553,492 B1 | | 4/2003 | Hosoe |
| 6,553,496 B1 | | 4/2003 | Buer |
| 6,625,727 B1 | | 9/2003 | Moyer et al. |
| 6,687,140 B2 | | 2/2004 | Kitamura |
| 6,704,865 B1 | | 3/2004 | Duff |
| 6,745,306 B1 | | 6/2004 | Willman et al. |
| 6,789,182 B1 | | 9/2004 | Brothers et al. |
| 6,835,579 B2 | | 12/2004 | Elward |
| 6,836,548 B1 | | 12/2004 | Anderson et al. |
| 6,859,876 B2 | | 2/2005 | Dykes et al. |
| 6,910,094 B1 | | 6/2005 | Eslinger et al. |
| 6,928,551 B1 | | 8/2005 | Lee et al. |
| 7,039,816 B2 | | 5/2006 | Kocher et al. |
| 7,057,396 B2 | | 6/2006 | Nagase |
| 7,062,615 B2 | | 6/2006 | Miller et al. |
| 7,107,459 B2 | | 9/2006 | Caronni et al. |
| 7,130,752 B2 | | 10/2006 | Yoshida et al. |
| 7,185,249 B2 | | 2/2007 | Tkacik et al. |
| 7,218,567 B1 | | 5/2007 | Trimberger et al. |
| 7,222,053 B2 | | 5/2007 | Snyder et al. |
| 7,237,121 B2 | | 6/2007 | Cammack et al. |
| 7,265,611 B2 | | 9/2007 | Wang |
| 7,299,347 B1 * | | 11/2007 | Kao .................................. 713/2 |
| 7,299,365 B2 | | 11/2007 | Evans |
| 7,305,534 B2 | | 12/2007 | Watt et al. |
| 7,360,073 B1 | | 4/2008 | Billstrom et al. |
| 7,398,441 B1 | | 7/2008 | Gee |
| 7,423,529 B2 | | 9/2008 | Singer et al. |
| 7,424,398 B2 | | 9/2008 | Booth et al. |
| 7,457,960 B2 | | 11/2008 | Kablotsky |
| 7,512,719 B1 | | 3/2009 | Gillespie |
| 7,525,836 B2 | | 4/2009 | Backus et al. |
| 7,549,064 B2 | | 6/2009 | Elbert et al. |
| 7,568,112 B2 | | 7/2009 | Yamaguchi |
| 7,571,475 B2 | | 8/2009 | Moon |
| 7,580,919 B1 | | 8/2009 | Hannel et al. |
| 7,657,760 B2 | | 2/2010 | Teramoto et al. |
| 7,667,997 B2 | | 2/2010 | Rodriguez |
| 7,681,024 B2 | | 3/2010 | Kwon |
| 7,729,156 B2 | | 6/2010 | Rodriguez et al. |
| 7,733,250 B1 | | 6/2010 | Tsyrganovich |
| 7,757,098 B2 | | 7/2010 | Brannock et al. |
| 7,761,904 B2 | | 7/2010 | Hessel et al. |
| 7,774,619 B2 | | 8/2010 | Paaske et al. |
| 7,793,067 B2 | | 9/2010 | Kegel et al. |
| 7,831,839 B2 | | 11/2010 | Hatakeyama |
| 7,844,835 B2 | | 11/2010 | Ginter et al. |
| 7,937,596 B2 | | 5/2011 | Mackey et al. |
| 7,949,912 B1 | | 5/2011 | Trimberger |
| 7,954,153 B2 | | 5/2011 | Bancel et al. |
| 7,966,467 B1 | | 6/2011 | Ludloff et al. |
| 8,027,927 B2 | | 9/2011 | Ogg et al. |
| 8,572,410 B1 * | | 10/2013 | Tkacik et al. .................. 713/193 |
| 8,621,597 B1 | | 12/2013 | Jenkins |
| 8,819,839 B2 | | 8/2014 | Henry et al. |
| 2001/0010086 A1 | | 7/2001 | Katayama et al. |
| 2002/0120851 A1 | | 8/2002 | Clarke |
| 2002/0129195 A1 | | 9/2002 | Hongo et al. |
| 2003/0133574 A1 | | 7/2003 | Caronni et al. |
| 2003/0140228 A1 | | 7/2003 | Binder |
| 2003/0197638 A1 | | 10/2003 | Bloebaum et al. |
| 2003/0200453 A1 | | 10/2003 | Foster et al. |
| 2003/0200454 A1 | | 10/2003 | Foster et al. |
| 2004/0078664 A1 | | 4/2004 | Takahashi |
| 2004/0088333 A1 | | 5/2004 | Sidman |
| 2004/0148480 A1 | | 7/2004 | Watt et al. |
| 2004/0153593 A1 | | 8/2004 | Watt et al. |
| 2004/0210764 A1 | | 10/2004 | McGrath et al. |
| 2004/0267847 A1 | | 12/2004 | Harper |
| 2005/0091554 A1 | | 4/2005 | Loukianov |
| 2005/0120216 A1 | | 6/2005 | Lee et al. |
| 2005/0144358 A1 | | 6/2005 | Conley et al. |
| 2005/0154903 A1 | | 7/2005 | Evans |
| 2005/0235166 A1 | | 10/2005 | England et al. |
| 2006/0010356 A1 | | 1/2006 | Snyder et al. |
| 2006/0023486 A1 | | 2/2006 | Furusawa et al. |
| 2006/0031685 A1 | | 2/2006 | Chen et al. |
| 2006/0059345 A1 | | 3/2006 | Fayad et al. |
| 2006/0059373 A1 | | 3/2006 | Fayad et al. |
| 2006/0059374 A1 | | 3/2006 | Hameau et al. |
| 2006/0090084 A1 | | 4/2006 | Buer |
| 2006/0095726 A1 | | 5/2006 | Zaabab et al. |
| 2006/0101241 A1 | | 5/2006 | Curran et al. |
| 2006/0155988 A1 * | | 7/2006 | Hunter et al. ................. 713/164 |
| 2006/0168212 A1 | | 7/2006 | Parsons et al. |
| 2006/0179302 A1 | | 8/2006 | Hatakeyama |
| 2006/0179324 A1 | | 8/2006 | Hatakeyama |
| 2006/0184791 A1 | | 8/2006 | Schain et al. |
| 2006/0208884 A1 | | 9/2006 | Diamant |
| 2006/0215437 A1 | | 9/2006 | Trika et al. |
| 2006/0225142 A1 | | 10/2006 | Moon |
| 2006/0247873 A1 | | 11/2006 | Fung et al. |
| 2007/0067644 A1 | | 3/2007 | Flynn et al. |
| 2007/0136576 A1 | | 6/2007 | Chambers et al. |
| 2007/0136606 A1 | | 6/2007 | Mizuno |
| 2007/0140477 A1 | | 6/2007 | Wise |
| 2007/0174909 A1 | | 7/2007 | Burchett et al. |

(56) References Cited

U.S. PATENT DOCUMENTS

| | | |
|---|---|---|
| 2007/0192610 A1 | 8/2007 | Chun et al. |
| 2007/0192828 A1 | 8/2007 | Messina et al. |
| 2007/0204170 A1 | 8/2007 | Oren et al. |
| 2007/0226494 A1 | 9/2007 | O'Brien et al. |
| 2007/0237325 A1 | 10/2007 | Gershowitz et al. |
| 2007/0237332 A1 | 10/2007 | Lyle |
| 2007/0283140 A1 | 12/2007 | Jones et al. |
| 2008/0005577 A1* | 1/2008 | Rager et al. .......... 713/183 |
| 2008/0005586 A1 | 1/2008 | Munguia |
| 2008/0010567 A1 | 1/2008 | Hughes et al. |
| 2008/0072018 A1 | 3/2008 | Le et al. |
| 2008/0112405 A1 | 5/2008 | Cholas et al. |
| 2008/0137848 A1 | 6/2008 | Kocher et al. |
| 2008/0162848 A1 | 7/2008 | Broyles et al. |
| 2008/0165952 A1 | 7/2008 | Smith et al. |
| 2008/0172538 A1 | 7/2008 | Dice et al. |
| 2008/0183305 A1 | 7/2008 | Foster et al. |
| 2008/0184038 A1 | 7/2008 | Fitton |
| 2008/0276092 A1 | 11/2008 | Eberhardt et al. |
| 2008/0282345 A1 | 11/2008 | Beals |
| 2009/0031135 A1 | 1/2009 | Kothandaraman |
| 2009/0055637 A1 | 2/2009 | Holm et al. |
| 2009/0138699 A1 | 5/2009 | Miyazaki et al. |
| 2009/0150546 A1 | 6/2009 | Ryan |
| 2009/0150662 A1 | 6/2009 | Desselle et al. |
| 2009/0154705 A1 | 6/2009 | Price et al. |
| 2009/0172496 A1 | 7/2009 | Roine |
| 2009/0196418 A1 | 8/2009 | Tkacik et al. |
| 2009/0259854 A1 | 10/2009 | Cox et al. |
| 2009/0262940 A1 | 10/2009 | Lim |
| 2009/0271619 A1 | 10/2009 | Fujii et al. |
| 2009/0276617 A1 | 11/2009 | Grell et al. |
| 2009/0290712 A1 | 11/2009 | Henry et al. |
| 2009/0292732 A1 | 11/2009 | Manolescu et al. |
| 2009/0293130 A1 | 11/2009 | Henry et al. |
| 2009/0328201 A1 | 12/2009 | Jin et al. |
| 2010/0037069 A1 | 2/2010 | Deierling et al. |
| 2010/0057960 A1 | 3/2010 | Renno |
| 2010/0064125 A1 | 3/2010 | Liu et al. |
| 2010/0077226 A1 | 3/2010 | Senga |
| 2010/0088739 A1 | 4/2010 | Hall et al. |
| 2010/0268942 A1 | 10/2010 | Hernandez-Ardieta et al. |
| 2010/0312940 A1 | 12/2010 | Shinohara |
| 2011/0012709 A1 | 1/2011 | Payson et al. |
| 2011/0026831 A1 | 2/2011 | Perronnin et al. |
| 2011/0095776 A1 | 4/2011 | Yunoki |
| 2011/0116635 A1 | 5/2011 | Bar-el |
| 2011/0154501 A1 | 6/2011 | Banginwar |
| 2011/0185165 A1 | 7/2011 | Haga et al. |
| 2011/0302638 A1* | 12/2011 | Cha et al. .......... 726/6 |
| 2012/0185636 A1 | 7/2012 | Leon |
| 2012/0224691 A1 | 9/2012 | Purohit |
| 2012/0246432 A1 | 9/2012 | Hadley et al. |
| 2012/0326692 A1 | 12/2012 | Koizumi et al. |
| 2013/0024637 A1 | 1/2013 | Hadley |
| 2013/0024716 A1 | 1/2013 | Hadley |
| 2013/0031290 A1 | 1/2013 | Schwartz et al. |
| 2013/0305380 A1 | 11/2013 | Diehl |
| 2014/0115698 A1 | 4/2014 | Jogand-Coulomb et al. |
| 2014/0130189 A1 | 5/2014 | Hadley |
| 2014/0140512 A1 | 5/2014 | Hadley |
| 2014/0149729 A1* | 5/2014 | Hadley .......... 713/1 |
| 2014/0156961 A1 | 6/2014 | Hadley |
| 2014/0165206 A1 | 6/2014 | Hadley |
| 2014/0358949 A1 | 12/2014 | Hu |

FOREIGN PATENT DOCUMENTS

| | | |
|---|---|---|
| CN | 1886939 A | 12/2006 |
| CN | 101120353 A | 2/2008 |
| CN | 101426012 A | 5/2009 |
| CN | 101478538 A | 7/2009 |
| CN | 101995301 | 3/2011 |
| EP | 0987625 | 3/2000 |
| EP | 1762855 A1 | 3/2007 |
| JP | 1201762 | 8/1989 |
| JP | 06-028885 | 2/1994 |
| JP | 08-069697 | 3/1996 |
| JP | 1131068 | 2/1999 |
| JP | 2008192036 | 8/2008 |
| WO | WO-9745980 A1 | 12/1997 |
| WO | WO-9931665 | 6/1999 |
| WO | WO-2011080841 A1 | 7/2011 |

OTHER PUBLICATIONS

Anderson, R. et al., "Cryptographic Processors—A Survey," Proceedings of the IEEE, vol. 94, No. 2, Feb. 2006, pp. 357-369.

Bialas; "Intelligent Sensors Security", Sensors, Institute of Innovative Technologies EMAG, 40-189 Katowice, ul. Leopolda 31, Poland, ISSN 1424-8220, Jan. 22, 2010. <www.mdpi.com/journal/sensors>.

Datta et al.; "Calibration of On-Chip Thermal Sensors using Process Monitoring Circuits", University of Massachusetts, Amherst, MA USA, IEEE 978-1-4244-6455-5/10, 2010.

Fields, et al; "Cryptographic Key Protection Module in Hardware for the Need2know System", < http://ieeexplore.ieee.org/stamp/stamp.jsp?arnumber=1594225 > on pp. 814-817; vol. 1, Aug. 7-10, 2005.

Gilmont, et al; "An Architecture of Security Management Unit for Safe Hosting of Multiple Agents", < http://citeseerx.ist.psu.edu/viewdoc/summary?doi=10.1.1.21.3663 > on pp. 79-82, 1998.

International Search Report and Written Opinion received in PCT Application No. PCT/US2011/065081, mailed Jul. 25, 2012, 9 pgs.

International Search Report and Written Opinion received in PCT Application No. PCT/US2011/066750, mailed on Sep. 20, 2012, 10 pgs.

International Search Report and Written Opinion received in PCT Application No. PCT/US2012/020528, mailed Aug. 22, 2012, 9 pgs.

International Search Report and Written Opinion received in PCT Application No. PCT/US2012/023385, mailed May 22, 2012, 10 pgs.

International Search Report and Written Opinion received in PCT Application No. PCT/US2012/023794, mailed Sep. 24, 2012, 9 pgs.

International Search Report and Written Opinion received in PCT Application No. PCT/US2012/024367, mailed Jul. 16, 2012, 10 pgs.

International Search Report and Written Opinion received in PCT Application No. PCT/US2012/031542, mailed Sep. 27, 2012, 9 pgs.

International Search Report and Written Opinion received in PCT Application No. PCT/US2012/065066, mailed Jul. 16, 2012, 9 pgs.

Sun Microsystems, "Sun Cryptographic Accelerator 4000", Firmware Version 1.1, FIPS 140-2 Non-Proprietary, Security Policy, Level 3 Validation, Aug. 6, 2004, pp. 1-20, <oracle.com/technetwork/topics/security/140sp457-160924.pdf>.

Yang, et al; "Improving Memory Encryption Performance in Secure Processors", < http://ieeexplore.ieee.org/stamp/stamp.jsp?arnumber=1407851 > on pp. 630-640; vol. 54; Issue 5, May 2005.

Cengage Learning, "The Hexadecimal Number System and Memory Addressing," May 16, 2011, <http://web.archive.org/web/20110516210838/http://college.cengage.com/coursemate/technology_education/andrews_9781435497788/unprotected/book_level/The_Hexadecimial_Number_System_and_Memory_Addressing.pdf>.

Rick Smith, "Authentication," (excerpt), Feb. 2002, <http://www.visi.com/crypto/>.

D. Ibrahim, "Design of a multichannel temperature data logger with SD card storage," Electronics World, Feb. 2009, <http://www.mikroe.com/downloads/get/789/data_logger_ew_02_09.pdf>.

Dedrick et al., "An inexpensive, microprocessor-based, data logging system," Computers & Geosciences, 2000, vol. 26, pp. 1059-1066.

Extended European Search Report, Feb. 5, 2015, European Patent Application No. 12814537.2, 6 pages.

Hobbizine, "adding memory with i2c eeproms," May 16, 2010, (web page), <http://picaxe.hobbizine.com/eeprom.html>.

Limor, "Logger Shield: Datalogging for Arduino," (web page), May 17, 2011, <http://www.ladyada.net/make/logshield/index.html>.

Machine Translation of Koizumi et al. (WO2011/080841), obtained via Google Translate on Mar. 23, 2015.

(56) References Cited

OTHER PUBLICATIONS

Maxim Integrated Products, "DS1678 Real-Time Event Recorder," 2005, <http://datasheets.maximintegrated.com/en/ds/DS1678.pdf>.
Microsoft Corp., "BitLocker Drive Encryption: Scenarios, User Experience, and Flow," May 16, 2006, available at: <http://msdn.microsoft.com/en-us/library/windows/hardware/gg463165.aspx>.
Microsoft Corp., "BitLocker Drive Encryption: Technical Overview," May 16, 2006.
Microsoft, "How To: Configure MachineKey in ASP.NET 2.0," available Mar. 9, 2012, <http://msdn.microsoft.com/en-us/library/ff649308.aspx>.
National Institute of Standards and Technology, "Security Requirements for Cryptographic Modules," FIPS PUB 140-2, May 25, 2001, <http://csrc.nist.gov/publications/fips/fips140-2/fips1402.pdf>.
National Institute of Standards and Technology, "Security Requirements for Cryptographic Modules," FIPS PUB 140-3, Draft, p. 16, Sep. 11, 2009, and Annexes A-G <http://csrc.nist.gov/publications/PubsDrafts.html#FIPS-140—3>.
Raafat. S. Habeeb, "Design a Programmable Sequence Controller Utilizing I2C BUS," 2011, Journal of Madenat Alelem College, vol. 3, iss. 2, pp. 5-25, <http://www.iasj.net/iasj?func=fulltext&aId=60778>.
Revolution Education Ltd., "Picaxe Datalogger (AXE110P)," version 2.0, (web page), Dec. 2010, <http://www.picaxe.com/docs/axe110.pdf>.
Supplementary European Search Report, Apr. 22, 2015, European Patent Application No. 11869688.9, 6 pages.
ViaSat, Inc., "Requirements Description for an Advanced Cryptographic Module (ACM) to Support the High Capacity Communications Capability (HC3)," Technical Report, Oct. 18, 2005, <http://cryptome.org/acm-hc3.htm>.
Yang, et al; "Improving Memory Encryption Performance in Secure Processors", <http://ieeexplore.ieee.org/stamp/stamp.jsp?arnumber=1407851 > On pp. 630-640; vol. 54; Issue: 5, May, 2005.
Yao, et al.; "Calibrating On-chip Thermal Sensors in Integrated Circuits: A Design-for-Calibration Approach", Springer Science+Business Media, LLC 2011, Sep. 21, 2011.
Supplementary Partial European Search Report, European Patent Application No. 12814434.2, Jan. 28, 2016, 10 pages.

* cited by examiner

SECURE BOOT INFORMATION WITH VALIDATION CONTROL DATA SPECIFYING A VALIDATION TECHNIQUE

CROSS-REFERENCE TO RELATED APPLICATIONS

This application claims priority to U.S. provisional patent application No. 61/509,078, filed on Jul. 18, 2011, which is hereby incorporated by reference herein in its entirety.

BACKGROUND

A computing device, such as a device including a processor, may interact with secret or otherwise sensitive information during operation. As such, some computing devices may operate to protect the sensitive information. For example, a computing device may encrypt sensitive information using a security parameter, such as an encryption key, stored on the device. The computing device may also operate to protect the security parameter stored on the device.

BRIEF DESCRIPTION OF THE DRAWINGS

The following detailed description references the drawings, wherein.

DETAILED DESCRIPTION

Figure 1:
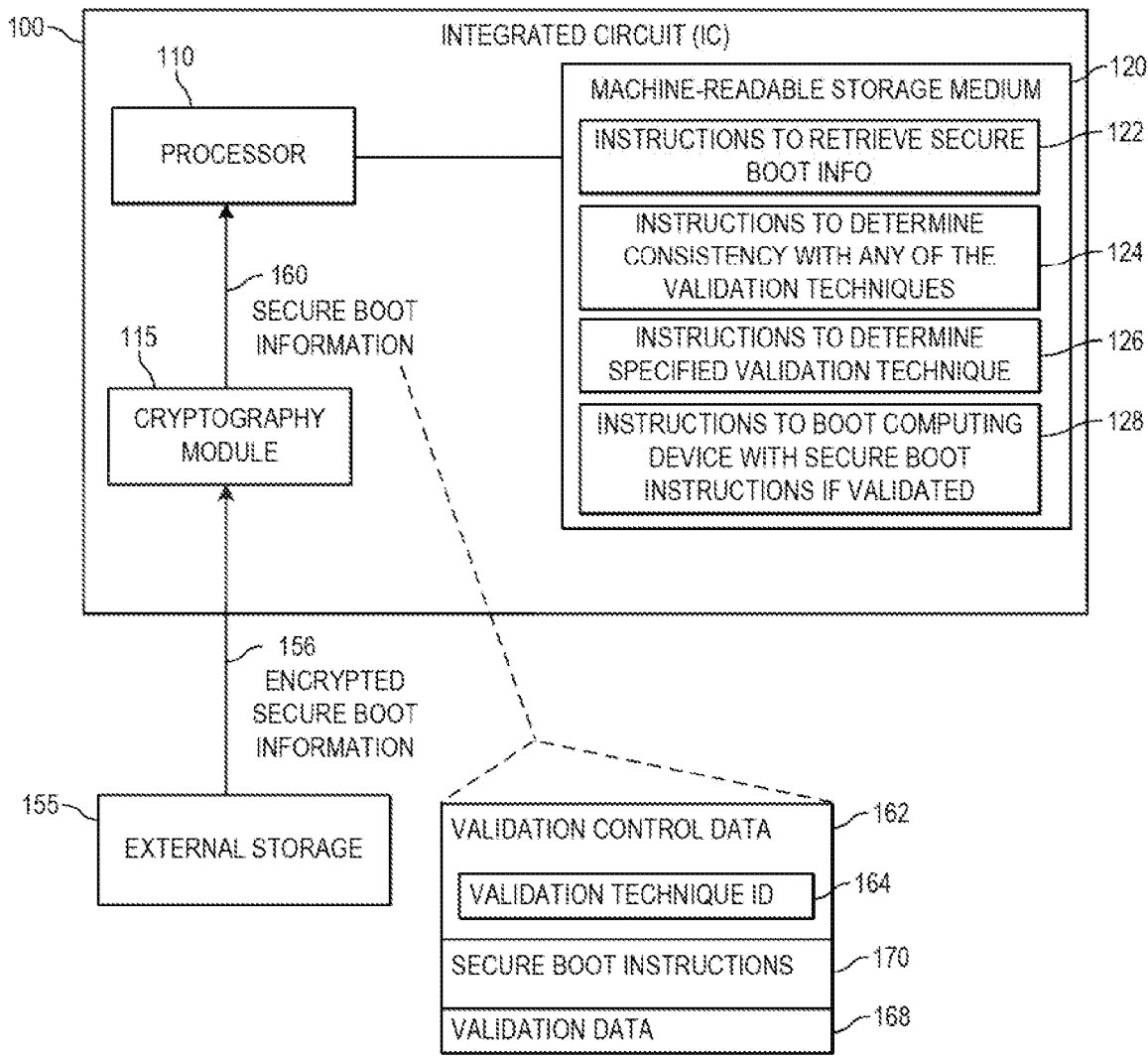
FIG. 1 is a block diagram of an example integrated circuit (IC) to validate secure boot information with a validation technique specified in the secure boot information.

As noted above, a computing device may operate to protect sensitive information using security parameters stored on the computing device. To protect both the sensitive information and the security parameters, an integrated circuit (IC) of a computing device may have multiple operating states that may each be utilized in different stages of the life cycle of the computing device. For example, when a computing device is being developed, tested, and/or initialized in a controlled environment, the IC may be operated in a clear state in which the IC provides little or no security for information stored on or utilized by the IC. For example, boot instructions executed by the IC in this clear state may be stored outside the processor in a cleartext (e.g., unencrypted, uncompressed, etc.) format.

When the computing device is operated in an environment in which it is vulnerable to security threats, the IC may be operated in a secure state in which the device may provide more security for information stored on or utilized by the IC than in the clear state. For example, secure boot information used to boot the computing device in the secure state may be stored outside of the IC in an encoded (e.g., encrypted) format to prevent an unauthorized party from determining the content of the information and tampering with the information to gain access to security parameters stored on the IC. Additionally, in response to a breach of the computing device's security, the IC may zeroize its security parameters and operate thereafter in a zeroize state in which the IC provides event reporting and diagnostic functionalities until the device is returned to the controlled environment.

To provide additional security for the secure state, an IC may perform an integrity check with a predefined validation technique to validate the integrity of the secure boot information stored outside of the IC prior to using the information (e.g., executing instructions). Different validation techniques provide different tradeoffs in complexity, speed, and security, so one validation technique may not be suitable or desirable for every context. For example, a fast, relatively simple validity check may be suitable for a computing device for which there is a relatively low risk of security threats. However, a more complex, more secure, slower validation technique may be desired for a computing device that, for example, is more vulnerable to security threats, that uses more sensitive information, etc. Additionally, a computing device may not meet certain security standards (e.g., government-imposed security standards) unless a particular validation technique is used.

To address these issues, in examples disclosed herein, an IC may verify the validity of secure boot information stored external to the IC by retrieving the secure boot information, determining a validation technique specified in the secure boot information, and verifying the integrity of the secure boot information with the specified validation technique. In such examples, the IC may be capable of using any one of a plurality of different validation techniques to validate the secure boot information. In this manner, examples disclosed herein may provide a single IC that may be used in a variety of contexts regardless of a desired validation technique. Additionally, by allowing a desired validation technique to be specified in the information to be validated, examples disclosed herein may provide much flexibility for the manner of validating information integrity. For example, as security threats or standards change, examples disclosed herein may allow the validation technique used by an IC to be readily changed by changing the validation technique specified in the information to be validated.

Referring now to the drawings. FIG. 1 is a block diagram of an example integrated circuit (IC) 100 to validate secure boot information with a validation technique specified in the secure boot information. In the example of FIG. 1, IC 100 includes a processor 110, a cryptography module 115, a machine-readable storage medium 120 including (e.g., encoded with) instructions 122, 124, 126, and 128. In some examples, storage medium 120 may include additional instructions. In other examples, instructions 122, 124, 126, 128, and any other instructions described herein in relation to storage medium 120 may be stored remotely from IC 100. In some examples, IC 100 may be included in a computing device. As used herein, a "computing device" may be a desktop or notebook computer, a tablet computer, a computer networking device (e.g., a hardware security module), a server, or any other device or equipment (e.g., an automated teller machine (ATM), etc.) including a processor.

As used herein, a "processor" may be electronic circuitry including at least one of a central processing unit (CPU), a graphics processing unit (GPU), a field-programmable gate array (FPGA) configured to retrieve and execute instructions stored on a machine-readable storage medium, other electronic circuitry suitable for the retrieval and execution of such instructions, or a combination thereof. Processor 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

Additionally, as used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

In some examples, instructions 122 may retrieve, with processor 110, secure boot information 156 from external storage 155. In examples described herein, external storage 155 may be a machine-readable storage medium. In some examples, external storage 155 may be external to IC 100. In the example of FIG. 1, instructions 122 may cause processor 110 to retrieve secure boot information 156 via cryptography module 115 to decrypt secure boot information 156, which may be stored in an encrypted format in external storage 155. In some examples, instructions 122 may retrieve secure boot information 156 beginning at a secure reset vector. As used herein, a "reset vector" may be an address from which a processor may first retrieve information after undergoing a reset. In some examples, IC 100 may include multiple reset vectors. For example, a "secure reset vector" may be a reset vector used after a reset in a secure state, a "clear reset vector" may be a reset vector used after a reset in clear state, and a "zeroize reset vector" may be a reset vector used after a reset in zeroize state.

As used herein, a "cryptography module" is a module implementing at least one information formatting technique and that may reformat input information with any one of the formatting techniques. Example information formatting techniques that may be implemented by a cryptography module include, for example, encryption and/or decryption techniques, compression and/or decompression techniques, and any other information encoding and/or decoding techniques. In some examples, a cryptography module may implement a plurality of different formatting techniques and reformat input information with a selected one of the formatting techniques. Any cryptography module described herein may be implemented in the form of electronic circuitry, in the form of executable instructions encoded on a machine-readable storage medium, or a combination thereof.

Additionally, as used herein, "boot information" is information that may be used by a processor of a computing device to boot the computing device. In some examples, the boot information may include at least one of boot data (e.g., addresses and/or other information, etc.) and boot instructions. As used herein. "boot instructions" are a set of instructions that may be executed by a processor of a computing device to boot the computing device. Boot instructions may include, for example, instructions to test and/or configure components and/or functionalities of the computing device. In such examples, computing device components that may be tested and/or configured may include a processor, memory, a memory management unit, cryptographic functionalities, and the like, or a combination thereof. Also, as used herein, "secure boot information" may be boot information used to boot a computing device in a secure mode of operation. In some examples, secure boot information may include secure boot instructions, which may be boot instructions used to boot a computing device in a secure mode of operation.

In some examples, instructions 122, when executed, may cause processor 110 to provide at least one read request to external storage 155 (e.g., via an external bus controller) to retrieve secure boot information 156. In response to the at least one read request, external storage 155 may provide encrypted secure boot information 156 to cryptography module 115 (e.g. via the external bus controller). In such examples, cryptography module 115 may decrypt the encrypted secure boot information 156 to generate decrypted secure boot information 160, which may be in a cleartext format. In some examples, in response to the read request, a memory management unit may configure cryptography module 115 with cryptographic information corresponding to the memory region targeted in the read request, such as a cryptographic technique, a cryptographic key, or the like. In such examples, cryptography module 115 may use this cryptographic information to decrypt information read from storage 155. In some examples, cryptography module 115 may provide decrypted secure boot information 160 to an internal storage at which processor 110 may access secure boot information 160. In other examples, cryptography module 115 may provide decrypted secure boot information 160 to processor 110 without first providing the secure boot information 160 to internal storage. In such examples, processor 110 may store the received decrypted secure boot information 160 in internal storage (e.g., cache).

As used herein, information in a "cleartext" format for a given computing device is information that a processor of the computing device is able to execute or otherwise operate on without first reformatting (e.g., decrypting, decoding, etc.) the information. For example, instructions in a cleartext format may be instructions that the processor may execute without first reformatting the instructions. Information in a cleartext format may also be referred to herein as "decrypted" information. As used herein, information in an "encrypted" format for a given computing device is information in a format that a processor of the computing device may execute or otherwise operate on after the information is decrypted.

In the example of FIG. 1, secure boot information 160 may include validation control data 162, secure boot instructions 170, and validation data 168 for secure boot information 160. As used herein, "validation data" for a collection of information is data derived from the collection of information at a given point in time that may be used subsequently to determine whether the information (or a particular portion thereof) has changed since the generation of the validation data. In some examples, validation data for a collection of information may be, for example, a digest, a code, a hash, a digital signature, or the like, derived from at least a portion of the information. In some examples, validation control data 162 may be located at or near the beginning of secure boot information 160. In other examples, validation control data 162 may be located at any other location within secure boot information 160. Additionally, in the example of FIG. 1, validation data 168 is separate from validation control data 162. In some examples, validation data 168 may be located at or near the end of secure boot information 160. In other examples, validation data 168 may be located elsewhere in secure boot information 160. In other examples, validation control data 162 may include validation data 168. In some examples, encrypted secure boot information 156 may comprise secure boot information 160 in an encrypted format.

Storage medium 120 further comprises instructions 124 to determine, with any one of a plurality of different validation techniques, whether validation data 168 is consistent with the decrypted secure boot information 160. In such examples, instructions 124 may determine whether validation data 168 is consistent with secure boot information 160 using whichever of the plurality of validation techniques is specified in secure boot information 160. As used herein, a "validation technique" is a process for determining whether given validation data is consistent with a given collection of information. Additionally, as used herein, validation data "is consistent with" a collection of information for a given validation technique if test data derived from at least a portion of the information as part of the validation technique is equivalent to the validation data or data derived from the validation data as part of the validation technique.

In the example of FIG. 1, instructions 124 may utilize any one of a plurality of different validation techniques to determine whether validation data 168 is consistent with the decrypted secure boot information 160. In some examples, instructions 124 may include instructions to perform each of the plurality of different validation techniques. In other examples, instructions 124 may include instructions to utilize a cryptography module to perform each of the different validation techniques.

As used herein, validation techniques are "different" if they use different processes for determining whether validation data for a collection of information is consistent with the information. In some examples, validation techniques using different functions for deriving the test data from given information may be considered different validation techniques herein. For example, two hash validation techniques using different hash functions, respectively, to derive test data from a given set of information may be considered different validation techniques herein. Another example of different validation techniques may be an error-detection validation technique and a hash validating technique using different functions for deriving test data from a given collection of information. In other examples, validation techniques using different processes after deriving the test data may be considered different validation techniques herein. For example, a hash validation technique may determine that given validation data is consistent with given information if the validation data is equivalent to test data derived from the information using a hash function. However, a different digital signature validation technique may determine that the validation data is consistent with the given information if test data derived from the information is equivalent to other data derived by decrypting the validation data with a public key.

In the example of FIG. 1, instructions 126 may determine which of the plurality of different validation techniques is specified in validation control data 162 of secure boot information 160. For example, validation control data 162 may include a validation technique identifier 164. In such examples, instructions 126 may determine the specified validation technique of the plurality of validation techniques based on validation technique identifier 164.

In the example of FIG. 1, instructions 124 may determine whether validation data 168 is consistent with decrypted secure boot information 160 with the validation technique specified by identifier 164. In some examples, instructions 124 may determine, with the specified validation technique, whether validation data 168 is consistent with decrypted secure boot information 160 after all of secure boot information 156 is retrieved from external storage 155. In such examples, instructions 124 may cause test data to be derived from at least a portion of secure boot information 160 stored in internal memory of IC 100. In other examples, instructions 124 may determine, with the specified validation technique, whether validation data 168 is consistent with decrypted secure boot information 160 at least partially in parallel with retrieving secure boot information 156. For example, after retrieving and decrypting the portion of secure boot information 160 including validation control data 162, instructions 126 may determine the specified validation technique. In such examples, instructions 124 may begin deriving the test data from portions of secure boot information 160 output by cryptography module 115 before all of secure boot information 156 is retrieved from external storage 155. In such examples, instructions 124 may continue deriving the test data as the encrypted secure boot information 156 is retrieved and decrypted. In some examples, instructions 124 may derive the test data from information 160 output by cryptography module 115 before, after, or at least partially in parallel with information 160 being stored in internal storage of IC 100. In other examples, instructions 124 may derive the test data from information 160 output by cryptography module 115 before or at least partially in parallel with information 160 being encrypted again by cryptography module 115 and stored in other storage external to IC 100 (e.g., an external DRAM).

In some examples, instructions 128 may boot a computing device including IC 100 with secure boot instructions 170 if it is determined, with the validation technique specified by identifier 164 of control data 162, that validation data 168 is consistent with the decrypted secure boot information 160. As noted above, secure boot information 160 output by cryptography module 115 may be stored in internal storage (e.g., cache) of IC 100. In some examples, instructions 128 may boot the computing device with secure boot instructions 170 by causing processor 110 to jump to secure boot instructions 170 stored in the internal memory, or by otherwise transferring control to secure boot instructions 170 stored in the internal memory. In other examples, in response to determining that validation data 168 is consistent with secure boot information 160, instructions 128 may trigger the execution of secure boot instructions 170 stored in external storage 155. In such examples, instructions 128 may trigger the retrieval of at least secure boot instructions 170 via cryptography module 115 and the execution of the received secure boot instructions 170 without validating the retrieved information again. In other examples, instructions 128 may trigger the retrieval of at least secure boot instructions 170 stored in the other external storage (e.g., external DRAM) via cryptography module 115 and the execution of the received secure boot instructions 170 without validating the retrieved information again.

Examples described herein provide the ability to validate secure boot information using any one of a plurality of different validations techniques. In examples described herein, secure boot information retrieved from external storage may be validated using a validation technique specified in validation control data of the secure boot information. In this manner, examples disclosed herein may provide flexibility in the validation of information retrieved from external storage by implementing a plurality of different validation techniques and allowing a validation technique for validating a given collection of information to be specified in the information to be validated. In some examples, functionalities described herein in relation to FIG. 1 may be provided in combination with functionalities described herein in relation to any of FIGS. 2-5.

Figure 2:
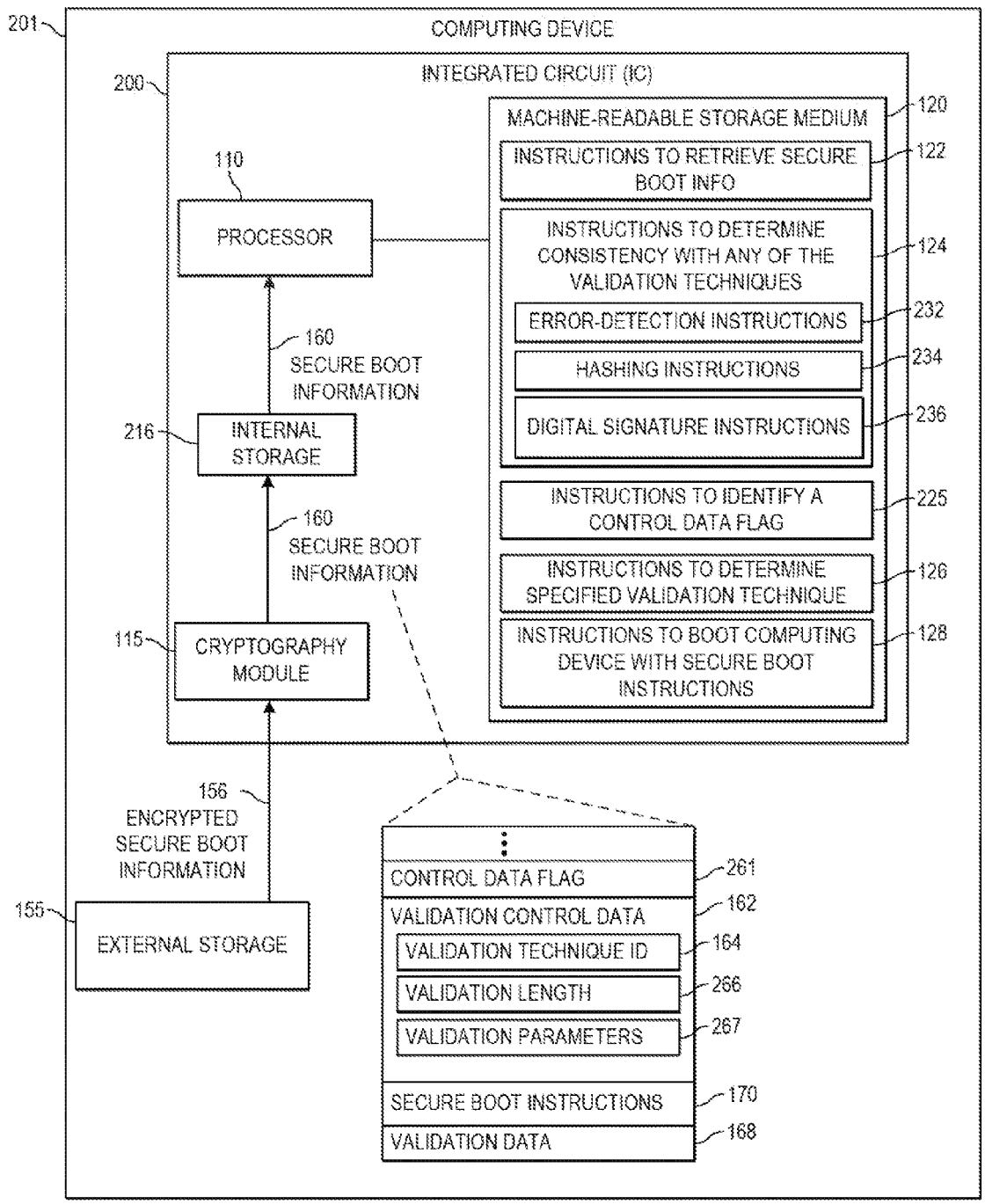
FIG. 2 is a block diagram of an example computing device comprising an IC to determine a validation technique specified in secure boot information.

FIG. 2 is a block diagram of an example computing device 201 comprising an IC 200 to determine a validation technique specified in secure boot information. In the example of FIG. 2, IC 200 may include a processor 110, a cryptography module 115, and a machine-readable storage medium 120, as described above in relation to FIG. 1. Storage medium 120 may include instructions 232, 234, 236, and 225, in addition to instructions 122, 124, 126, and 128 described above in relation to FIG. 1. IC 200 may also include internal storage 216, which may be a machine-readable storage medium. In addition to IC 200, computing device 201 may also include external storage 155, as described above in relation to FIG. 1. In other examples, external storage 155 may be remote from IC 200 and computing device 201.

In the example of FIG. 2, instructions 122, when executed, may cause processor 110 to retrieve secure boot information 156 from external storage 155 via cryptography module 115 to decrypt secure boot instructions 156 to generate decrypted secure boot information 160, as described above in relation to FIG. 1. In the example of FIG. 2, cryptography module 160 may store decrypted secure boot information 160 in internal storage 216. In such examples, processor 110 may access decrypted secure boot information 160 stored in internal storage 216.

In the example of FIG. 2, instructions 124 may determine whether validation data 168 of secure boot information 160 is consistent with secure boot information 160 with any one of a plurality of different validation techniques, as described above in relation to FIG. 1. In some examples, instructions 124 may derive test data from at least a portion of secure boot information 160 in accordance with the specified validation technique and determine whether the derived test data is equivalent to validation data 168 or data derived from validation data 168 as part of the specified validation technique.

In the example of FIG. 2, validation control data 162 may include a validation length 266. In such examples, instructions 124 may comprise instructions to derive the test data from a portion of decrypted secure boot information 160 having a length equal to validation length 266. For example, if instructions 124 derive the test data from information 160 using a hashing function, then instructions 124 may derive the test data by performing the hashing function on a portion of information 160 having a length equal to validation length 266, such as the first portion of information 160 having validation length 266. In other examples, the test data may be derived from the entire length of information 160, excluding validation data 168, for example.

In some examples, validation control data 162 may also include at least one validation parameter 267 for the validation technique specified by validation technique identifier 164. Validation parameters 267 may include, for example, at least one of an initialization value for a process for deriving test data from secure boot information (e.g. a cyclic redundancy check (CRC) technique), a public key used in a digital signature validation technique, the length of the public key, an indication of whether the public key is included in validation control data 162, and any other parameters that may be used by the validation technique specified by identifier 164. In examples in which the public key is not included in validation control data 162, the public key may be stored in IC 200.

In the example of FIG. 2, instructions 124 may include instructions to perform each of the plurality of different validation techniques to determine whether validation data 168 of secure boot information 160 is consistent with secure boot information 160. In some examples, instructions 124 may include instructions 232 to determine, with an error-detection validation technique, whether validation data 168 is consistent with decrypted secure boot information 160. In examples described herein, an error-detection validation technique may be a validation technique in which the test data is derived from a given collection of information by an error-detection process, such as a checksum process, a cyclic redundancy check (CRC) process, or any other suitable error-detection process. In such examples, an error-detection validation technique may determine that given validation data is consistent with the given information if the test data derived with the error-detection process is equivalent to the validation data. In some examples, instructions 232 may include a plurality of different error-detection validation techniques, each deriving the test data with a different error-detection process.

Instructions 124 may also include instructions 234 to determine, with a hashing validation technique, whether validation data 168 is consistent with decrypted secure boot information 160. In examples described herein, a hashing validation technique may be a validation technique in which the test data is derived from a given collection of information by performing a hash function on (i.e., hashing) at least a portion of the information. In such examples, a hashing validation technique may determine that given validation data is consistent with the given information if the test data derived by performing the hash function on the given information is equivalent to the validation data. In some examples, instructions 234 may include a plurality of different hashing validation techniques, each deriving the test data with a different hash function. Example hash functions may include, for example, cryptographic hash functions (e.g., SHA-256, SHA-512, etc.), non-cryptographic hash functions (e.g., FNV hash, etc.), or any other hash function.

Additionally, instructions 124 may include instructions 236 to determine, with a digital signature validation technique, whether validation data 168 is consistent with decrypted secure boot information 160. In examples described herein, a digital signature validation technique may be a validation technique in which test data is derived from given information by hashing at least a portion of the information and decrypted data is derived from given validation data by decrypting the validation data. In such examples, a digital signature validation technique may determine that the given validation data is consistent with the given information if the test data is equivalent to the decrypted data derived from the validation data. In some examples, instructions 236 may include a plurality of different digital signature validation techniques, each differing in at least one of a hash function for deriving test data, a decryption process, etc. Example digital signature validation techniques may include techniques based on, for example, an RSA/PKCS based technique, a federal information processing standard (FIPS) digital signature algorithm (DSA), a elliptic curve digital signature algorithm (ECDSA), an Elgamal signature technique, or any other digital signature technique.

In the example of FIG. 2, instructions 126 may determine which of the plurality of different validation techniques is specified by validation technique identifier 164 of validation control data 162 of secure boot information 160, as described above in relation to FIG. 1. In some examples, validation control data 162 may be located at any location within secure boot information 160. In such examples, secure boot information 160 may include a control data flag 261 in addition to validation control data 162, secure boot instructions 170, and validation data 168, as described above in relation to FIG. 1. Control data flag 261 may be any information indicating the location of validation control data 162 in decrypted secure boot information 160. For example, control data flag 261 may be a particular bit-mask, data pattern, or other information reserved for flag 261 and known by instructions 225. In such examples, instructions 225 may identify control data flag 261 in decrypted secure boot information 160 output from module 115.

In some examples, instructions 225 may use the location of flag 261 to determine the location of validation control data 162. For example, secure boot information 160 may be organized such that validation control data 162 directly follows flag 261 in secure boot information 160 or is located at another predefined location relative to flag 261 within information 160. In such examples, after instructions 225 identify the location of validation control techniques, instructions 126 may determine which of the plurality of different validation techniques is specified by validation technique identifier 164 of validation control data 162, as described above in relation to FIG. 1.

In other examples, secure boot information 160 may be organized such that validation control data 162 has a constant location in secure boot information 160. In such examples, flag 261 and instructions 225 may be omitted, and instructions 126 may look to the constant location within secure boot information 160 to find validation control data 162. For example, validation control data 162 may be located at a predefined offset within secure boot information 160. In such examples, instructions 126 may determine the specified validation technique from the validation technique identifier 164 of the validation control data 162 at the constant location within secure boot information 160. For example, validation control data 162 may start at a first location of secure boot information 160, or any other location in secure boot information 160.

In the example of FIG. 2, after instructions 126 determine the validation technique specified in validation control data 162, instructions 124 may determine whether validation data 168 is consistent with secure boot information 160 using whichever of the plurality of the validation techniques is specified by validation technique identifier 164 of validation control data 162. In some examples, instructions 124 may determine, with the specified validation technique, whether validation data 168 is consistent with decrypted secure boot information 160 at least partially in parallel with retrieving secure boot information 156, as described above in relation to FIG. 1. If instructions 124 determine that validation data 168 is not consistent with secure boot information 160, then instructions 124 may output an alarm and not boot computing device 201. The alarm may be output by instructions 124 on at least one status indicator (e.g., lights) of computing device 201 connected to IC 200.

In some examples, instructions 128 may boot computing device 201 with secure boot instructions 170 if it is determined, with the validation technique specified by identifier 164, that validation data 168 is consistent with decrypted secure boot information 160, as described above in relation to FIG. 1. In some examples, instructions 128 may trigger execution of secure boot instructions 170 by processor 110 if validation data 168 is determined to be consistent with information 160. In the example of FIG. 2, secure boot information 160 may be stored in internal storage 216. In such examples, instructions 128 may boot computing device 201 with instructions 170 by triggering execution, by processor 110, of secure boot instructions 170 stored on internal storage 216 if validation data 168 is consistent with decrypted secure boot information 160. In such examples, instructions 128 may cause processor 110 to jump to instructions 170 on internal storage 216, or otherwise transfer control to instructions 170. In other examples, instructions 128 may cause processor 110 to retrieve and execute instructions 170 from external storage 155 if validation data 168 is consistent with decrypted secure boot information 160. In other examples, secure boot information stored in internal storage 216 may be encrypted again by cryptography module 115 and stored in other storage external to IC 100, such as an external DRAM, if validation data 168 is consistent with decrypted secure boot information 160. In such examples, instructions 128 may cause processor 110 to retrieve and execute instructions 170 from the other external storage (e.g., external DRAM). In some examples, functionalities described herein in relation to FIGS. 1-2 may be provided in combination with functionalities described herein in relation to any of FIGS. 3-5.

Figure 3:
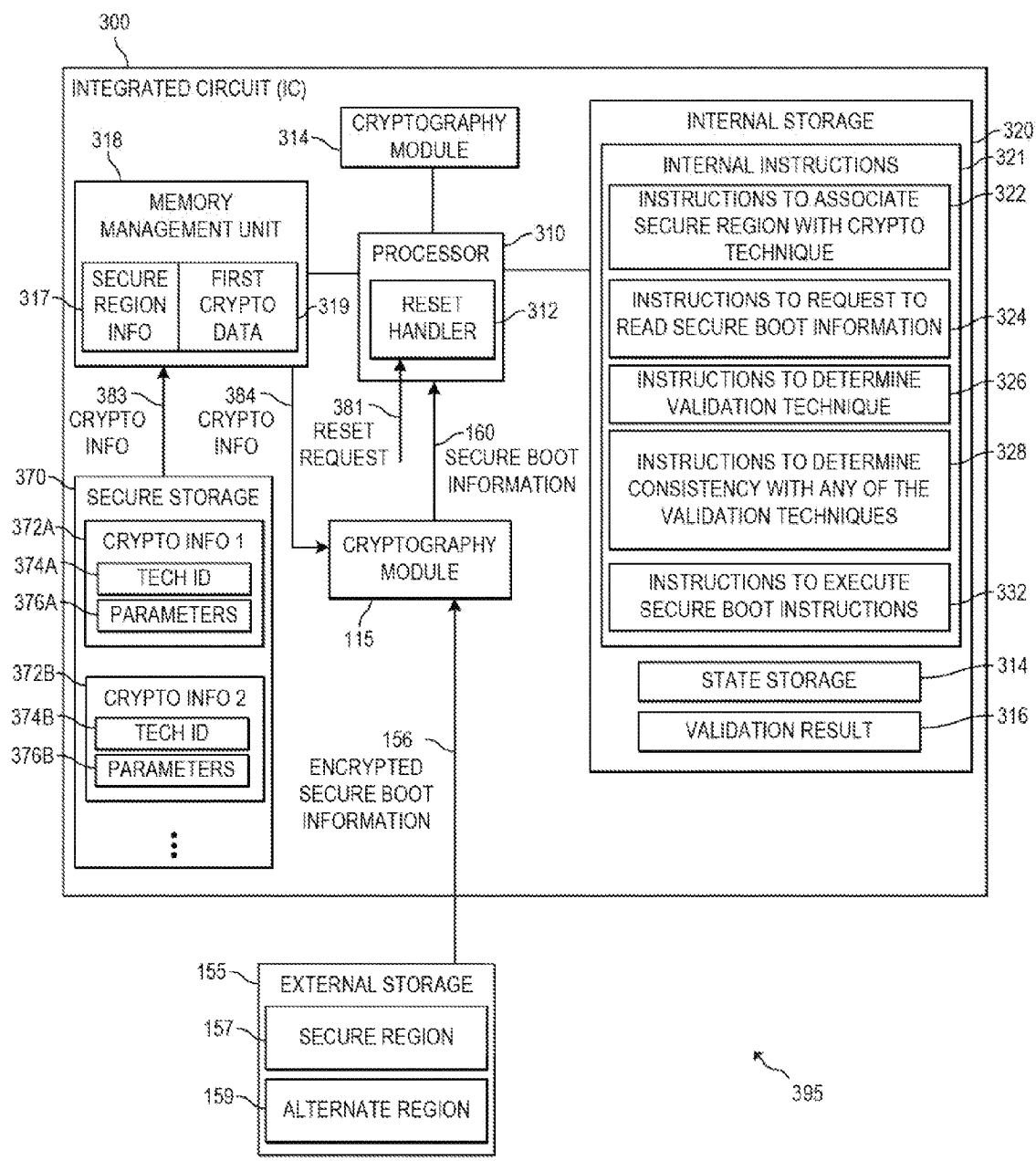
FIG. 3 is a block diagram of an example IC to decrypt and validate secure boot information stored in external storage.

FIG. 3 is a block diagram of an example computing system 395 including an IC 300 to decrypt and validate secure boot information stored in external storage 155. In the example of FIG. 3, computing system 395 includes IC 300 and external storage 155. IC 300 includes a processor 310 and internal storage 320 including (e.g., encoded with) a set of executable internal instructions 321, including instructions 322, 324, 326, 328, and 332. Internal storage 320 may be a machine-readable storage medium. Processor 310 may fetch, decode, and execute instructions stored on internal storage 320 to implement the functionalities described below. In other examples, the functionalities of any of the instructions of internal storage 320 may be implemented in the form of electronic circuitry, in the form of executable instructions encoded on a machine-readable storage medium, or a combination thereof.

IC 300 may also include a cryptography module 115, as described above in relation to FIG. 1, a cryptography module 314, a memory management unit 318, and secure storage 370. In some examples, memory management unit 318 may be implemented in the form of electronic circuitry, in the form of executable instructions encoded on a machine-readable storage medium, or a combination thereof. Secure storage 370 may be a machine-readable storage medium. Additionally, in some examples, secure storage 370 may be a machine-readable storage medium.

In the example of FIG. 3, processor 310 may execute internal instructions 321 in response to a reset request 381 if, at least, a secure state value is stored in operating state storage 314 of IC 300. In some examples, processor 310 may execute internal instructions 321 in response to a reset request 381 if a secure state value is stored in operating state storage 314 of IC 300. In other examples, processor 310 may execute internal instructions 321 in response to a reset request 381 if a secure state value is stored in operating state storage 314 and a non-validated value is stored in validation result storage 316 of IC 300.

In some examples, internal instructions 321 may be instructions to validate secure boot instructions prior to executing the secure boot instructions in a secure mode of operation. For example, it may be desirable to validate the integrity of secure boot information 160 prior to executing instructions 170 to provide additional protection for sensitive information and security parameters utilized by a computing device including IC 300. Such validation, which may delay booting, may not be desirable in a clear state primarily used in a secure environment or in a zeroize state in which security parameters have been zeroized and are likely not vulnerable. Accordingly, in some examples, internal instructions 321 may be executed in a secure state, and not in a clear or zeroize state.

In the example of FIG. 3, a reset handler 312 of processor 310 may receive reset request 381 and, in response to reset request 381, determine whether to execute internal instructions 321. In such examples, in response to reset request 381, reset handler 312 may determine whether a secure state value (e.g., a value indicating a secure state) is stored in operating state storage 314. In some examples, operating state storage 314 may store a value indicating the state (e.g., secure, clear, zeroize, etc.) in which IC 300 is to operate after reset. For example, if a clear state value or a zeroize state value is stored in state storage 314, then reset handler 312 may determine not to execute internal instructions 321 in response to reset request 381.

In some examples, reset handler 312 may determine to execute internal instructions 321 in response to reset request 381 if a secure state value is stored in operating state storage 314. In other examples, reset handler 312 may determine to execute internal instructions 321 in response to reset request 381 if a secure state value is stored in operating state storage 314 and a non-validated value is stored in validation result storage 316 for information 160, indicating that information 160 has not been validated. In such examples, reset handler 312 may determine not to execute internal instructions 321 if a valid result value is stored in result storage 316 for information 160, indicating that information 160 has already been validated, regardless of whether a secure state value is stored in storage 314. In some examples, if a clear state value is stored in storage 314, reset handler 312 may determine not to execute internal instructions 321, and may instead begin to retrieve information from a clear state reset vector. In such examples, if a zeroize state value is stored in storage 314, reset handler 312 may determine not to execute internal instructions 321, and may instead begin to retrieve information from a zeroize state reset vector.

In some examples, reset request 381 may be generated by instructions executed by processor 310 (e.g. a software generated reset). In other examples, reset request 381 may be received from outside of processor 310. Additionally, in some examples, at least one of operating state storage 314 and validation result storage 316 may be included in internal storage 320. In other examples, operating state storage 314 and validation result storage 316 may be separate from internal storage 320. In such examples, each of storage 314 and storage 316 may each be part of a machine-readable storage medium. Additionally, in some examples, the functionalities of reset handler 312 may be implemented in the form of electronic circuitry, in the form of executable instructions encoded on a machine-readable storage medium, or a combination thereof.

In some examples, if reset handler 312 determines to execute internal instructions 321, reset handler 312 may cause processor 310 to jump to internal instructions 321, transfer control to instructions 321, or otherwise trigger the execution of instructions 321. In the example of FIG. 3, internal instructions 321 include instructions 322, 324, 326, 328, and 332. Instructions 322 may associate a secure region 157 of external storage 155 with a first cryptographic technique in the memory management unit 318.

In some examples, memory management unit 318 may include information mapping regions of external storage 155 to cryptographic information to be used when retrieving information from those regions, respectively. In the example of FIG. 3, instructions 322 may associate secure region 157 with a first cryptographic technique by mapping secure region information 317 with first cryptographic data 319 in memory management unit 318. In such examples, secure region information 317 may be information corresponding to (e.g., identifying the addresses encompassed by) secure region 157 that may be used, for example, to identify access requests (e.g., read and write requests) for secure region 157. In some examples, first cryptographic data 319 may identify at least one of a first cryptographic technique and a cryptographic technique parameter. In other examples, first cryptographic data 319 may include a location of first cryptographic information stored outside of memory management unit 318. In such examples, instructions 322 may map secure region information 317 with an address at which first cryptographic information 372A is stored in secure storage 370.

Instructions 324 may request to read secure boot information 156 from secure region 157 of external storage 155. For example, instructions 324 may request to read secure boot information 156 from a secure reset vector, which may be an address in secure region 157. In some examples, in response to the request to read from secure region 157, cryptography module 155 may decrypt secure boot information 156 with the first cryptographic technique associated with secure region 157 in memory management unit 318 to generate decrypted secure boot information 160. Decrypted secure boot information 160 may be stored in internal storage by module 115, as described above in relation to FIGS. 1 and 2. In some examples, in response to a request to access external storage 155, memory management unit 318 may configure cryptography module 115 to use a cryptographic technique associated with the region to be accessed so that information read from or written to that region may be formatted using the appropriate cryptographic technique.

For example, processor 310 may provide the read request of instructions 324 to memory management unit 318, which may determine, based on secure region information 317, that the read request is a request to access secure region 157. In response, memory management unit 318 may configure cryptography module 115 with the first cryptographic technique based on first cryptographic data 319 associated with secure region information 317. For example, first cryptographic data 319 may be an address of first cryptographic information 372A in secure storage 370. In such examples, memory management unit 318 may retrieve first cryptographic information 372A from secure storage 370 in response to the read request. Memory management unit 318 may receive information 372A via a communication 383, and provide information 372A to cryptographic module 115, via a communication 384, to configure cryptography module 115 to utilize information 372A when reading from secure region 157. In other examples, first cryptographic data 319 may include first cryptographic information 372A, which memory management unit 318 may provide to cryptography module 115 in response to the read request.

In the example of FIG. 3, secure storage 370 may store at least one set of cryptographic information. For example, secure storage 370 may store first and second cryptographic information 372A and 372B. In such examples, first cryptographic information 372A may include at least one of a first cryptographic technique identifier 374A and at least one first technique parameter 376A. In some examples, second cryptographic parameters 372B may include at least one of a second cryptographic technique identifier 374B and at least one second technique parameter 376B.

In examples described herein, a cryptographic technique may be, for example, any information formatting technique, such as an encryption and/or decryption technique, a compression and/or decompression technique, or any other information encoding and/or decoding technique. In examples described herein, a technique parameter may be any parameter used by any cryptographic technique, such as, for example, an encryption key, a cryptographic mode identifier, an operation type identifier, an initialization value, or the like. In examples described herein, a cryptographic mode identifier may identify a mode in which a cryptographic technique is to operate (e.g., electronic codebook (ECB), cipher-block chaining (CBC), XTS-AES, etc.). Additionally, in examples described herein, an operation type identifier may identify an operation type (e.g., encryption, decryption, etc.) to be used with a cryptographic technique.

In some examples, other regions of external storage 155 may be associated with other cryptographic data in memory management unit 318. For example, alternate region 159 may be associated with second cryptographic data including second cryptographic information 372B or pointing to second cryptographic information 372B in secure storage 370. In such examples, in response to a request to access alternate region 159, memory management unit may provide second cryptographic information 372B to cryptography module 115 to configure module 115 to format information read from or written to region 159 in accordance with second cryptographic information 372B. In some examples, alternate region 159 may be a region storing boot information for the zeroize operating state or boot information for the clear operating state. In such examples, second cryptographic information 372B may include information for a different cryptographic technique than first cryptographic information 372A. Additionally, in some examples, cryptographic information, such as second cryptographic information 372B, may indicate that information is to be passed through cryptography module 115 without being reformatted. In such examples, second cryptographic information 372B may configure module 115 with a null cryptographic technique in which no reformatting is performed so that information stored in cleartext (e.g., clear state boot information) may be properly read through module 115 without reformatting (e.g., decrypting) the information.

In other examples, alternate region 159 may be another secure region of storage 155. In such examples, a first portion of secure boot information 156 may be stored in secure region 157 and a second portion of secure boot information 156 may be stored in alternate region 159. In such examples, the first and second portions of secure boot information 156 may be encrypted differently. In some examples, to appropriately decrypt each portion, regions 157 and 159 may be associated with different cryptographic information in memory management unit 318.

In such examples, memory management unit 318 may configure ayptographic module 115 with the appropriate cryptographic information when processor 310 accesses each region. For example, in response to any request to read from secure region 157, memory management unit 318 may configure cryptography module 115 with first cryptographic information 372A, as described above. Additionally, in response to any request to any request to read from alternate region 159, memory management unit 318 may configure cryptography module 115 with second cryptographic information 372B. In examples in which first and second portions of secure boot information 156 are encrypted differently, instructions 322 may additionally associate alternate region 159 with a second cryptographic technique in memory management unit 318 by, for example, associating region 159 with second cryptographic information 372B in memory management unit 318. Additionally, in some examples, cryptography module 115 may decrypt the first and second portions of secure boot information 156 to generate decrypted secure boot information 160.

In the example of FIG. 3, instructions 326 may determine which of a plurality of different validation techniques is specified in validation control data of secure boot information. For example, instructions 326 may determine which of a plurality of different validation techniques is specified in validation control data of secure boot information retrieved from secure region 157 and decrypted by cryptography module 115. In such examples, secure boot information may include validation control data, as described above in relation to FIGS. 1 and 2. In some examples, instructions 326 may determine the specified validation technique from a validation technique identifier included in the validation control data. For example, instructions 326 may determine the specified validation technique by accessing the validation control data of decrypted secure boot information 160 after at least a portion of secure boot information 156 has been decrypted to generate at least a portion of secure boot information 160. In some examples, the validation control data may include at least one of an identifier associated with one of the validation techniques, a validation technique parameter, and a validation length, as described above in relation to FIG. 2.

In some examples, instructions 328 may determine, with the specified validation technique, whether validation data of the decrypted secure boot information 160 is consistent with the decrypted secure boot information 160, as described above in relation to FIGS. 1 and 2. In some examples, the specified validation technique may include deriving test data from at least a portion of decrypted secure boot information 160, as described above in relation to FIGS. 1 and 2. In some examples, instructions 328 may derive the test data from the portion of decrypted secure boot information 160 in accordance with the specified validation technique at least in part with another cryptography module 314. In such examples, instructions 328 may instruct cryptography module 314 to derive the test data from the portion of decrypted secure boot information 160 in accordance with the specified validation technique (e.g., by hashing the information with a particular hash function, etc.). In some examples, the test data may be derived at least partially in parallel with retrieving encrypted secure boot information 156 from external storage, as described above in relation to FIGS. 1 and 2.

In the example of FIG. 3, instructions 332 may cause processor 310 to execute secure boot instructions of decrypted secure boot information 160 (e.g., instructions 170 of FIG. 2) in response to determining that the validation data is consistent with decrypted secure boot information 160. In some examples, instructions 332 may cause processor 310 to execute secure boot instructions of secure boot information 160 stored in internal storage of IC 300, as described above in relation to FIG. 2.

In other examples, instructions 332 may cause processor 310 to execute secure boot instructions of encrypted secure boot information 156 stored on external storage 155. For example, in response to determining that the validation data is consistent with decrypted secure boot information 160, instructions 332 may store a valid result value in validation result storage 316 and then generate a reset request 381. In such examples, in response to the reset request 381, reset handler 312 may determine that a secure state value is stored in storage 314 and a valid result value is stored in storage 316 and thus determine not to execute internal instructions 321, since secure boot information 156 has already been validated. In such examples, reset hander 312 may cause processor 310 to jump to secure boot instructions of secure boot information 156 stored on external storage 155 to boot a computing device including IC 300. In such examples, the secure boot instructions may be retrieved from external storage 155, decrypted by cryptography module 115 as configured by memory management unit 318 according to the memory region being accesses as described above, and executed by processor 310 after being decrypted.

Figure 4:
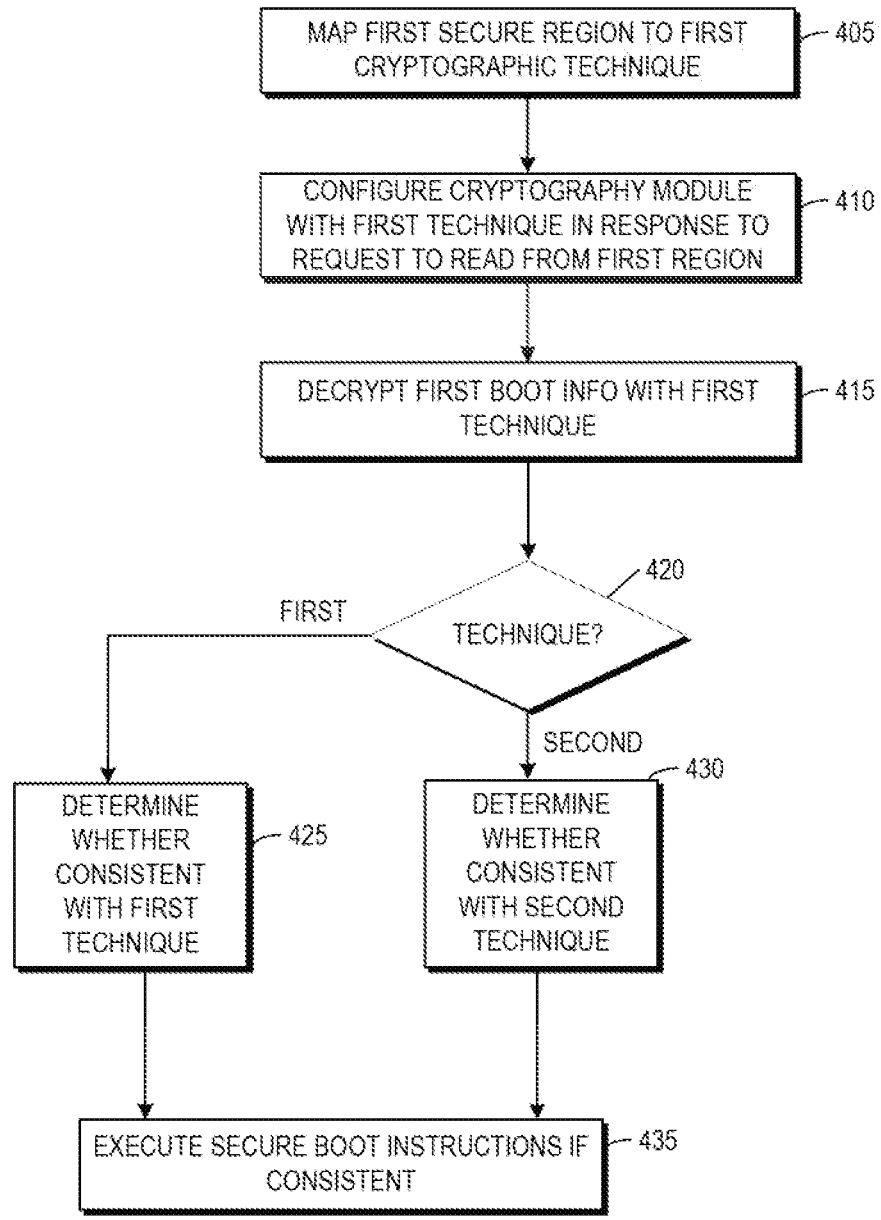
FIG. 4 is a flowchart of an example method for generating test validation data with a validation technique specified in validation control data.

FIG. 4 is a flowchart of an example method 400 for generating test validation data with a validation technique specified in validation control data. Although execution of method 400 is described below with reference to computing system 395 of FIG. 3, other suitable components for execution of method 400 can be utilized (e.g., IC 100 and computing device 201). Additionally, method 400 may be implemented in the form of executable instructions encoded on a machine-readable storage medium, in the form of electronic circuitry, or a combination thereof.

At 405 of method 400, processor 310 may map a first secure region of external storage (e.g., secure region 157) to a first cryptographic technique in memory management unit 318 of IC 300. In some examples, the processor 310 may map or otherwise associate information identifying the first secure region with an address of first cryptographic information 372A in secure storage 370. In such examples, first cryptographic information 372A may include a technique identifier 374A identifying the first cryptographic technique. At 410, memory management unit 318 may, in response to a request from processor 310 to read from the first secure region storing at least a first portion of secure boot information, configure cryptography module 115 of IC 300 to decrypt information with the first cryptographic technique. In some examples, memory management unit 318 may configure module 115 by providing first cryptographic information 372A to module 115, as described above in relation to FIG. 3. In some examples, the first portion of the secure boot information may be a first portion of encrypted secure boot information 156 stored in external storage 155. In such examples, a second portion of secure boot information 156 may be stored in another region of external storage 155 (e.g., alternate region 159) and may be encrypted differently than the first portion of the secure boot information. In other examples, all of encrypted secure boot information 156 may be encrypted in the same manner (e.g., with the same technique and key) and stored in the first secure region (e.g., secure region 157).

At 415, cryptography module 115 may decrypt at least the first portion of the secure boot information with the first cryptographic technique as the secure boot information is read from external storage 155. In some examples, processor 310 may read the secure boot information from external storage 155 via cryptography module 115, which may decrypt at least the first portion of the secure boot information as it is read from external storage 155. In such examples, memory management unit 318 may configure cryptography module 115 to decrypt information read from the first secure region with the first cryptographic technique (e.g., decryption technique) specified in first cryptographic information 372A and any first parameters specified therein, as described above. In examples in which all of the secure boot information is stored in the first secure region, module 115 may decrypt all of the secure boot information with the first cryptographic technique and the first parameters.

In some examples, the secure boot information may include validation control data, as described above in relation to FIGS. 1-3. At 420, processor 310 may determine what validation technique is specified by the validation control data of the secure boot information. In some examples, the validation control data may include a validation technique identifier, as described above in relation to FIGS. 2 and 3. In such examples, processor 310 may determine, at 420, the validation technique indicated by the validation technique identifier of the validation control data.

If the validation control data specifies the first validation technique, then method 400 may proceed to 425. At 425, processor 310 may determine, with the first validation technique, whether validation data of the secure boot information is consistent with the secure boot information, as described above in relation to FIGS. 1 and 2. If the validation control data specifies the second validation technique, then method 400 may proceed to 430. At 430, processor 310 may determine, with the second validation technique, whether validation data of the secure boot information is consistent with the secure boot information, as described above in relation to FIGS. 1 and 2. In the example of FIG. 4, the first and second validation techniques are different validation techniques.

At 435, processor 310 may execute secure boot instructions of the secure boot information if the validation data is consistent with the secure boot information. For example, if the specified validation technique is the first validation technique, processor 310 may execute the secure boot instructions if the validation data was determined, with the first validation technique, to be consistent with the secure boot information. In other examples, if the specified validation technique is the second validation technique, processor 310 may execute the secure boot instructions if the validation data was determined, with the second validation technique, to be consistent with the secure boot information. In some examples, the secure boot instructions may be executed as described above in relation to FIGS. 1-3.

Figure 5:
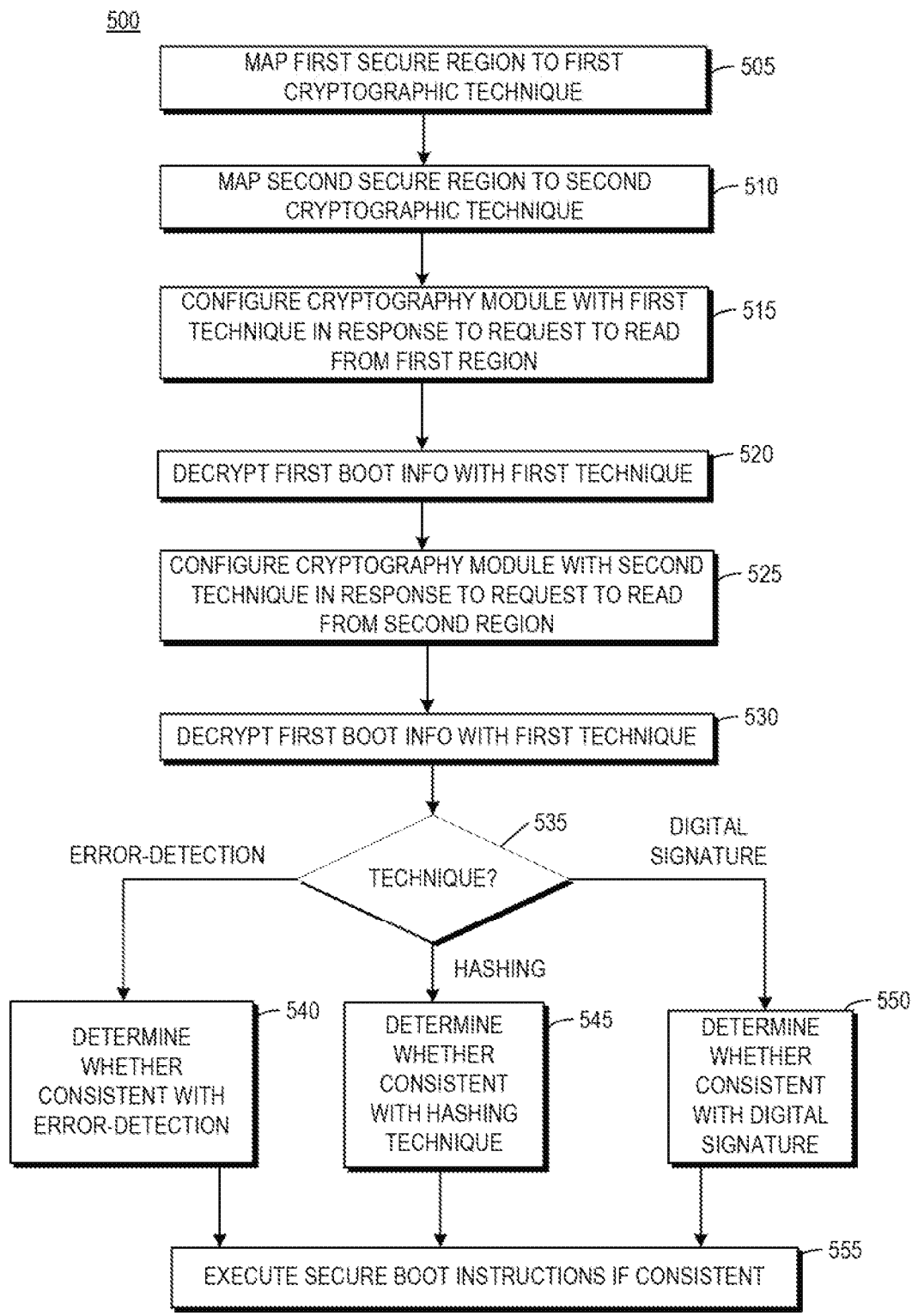
FIG. 5 is a flowchart of an example method for decrypting secure boot information with at least one cryptographic technique and a specified validation technique.

FIG. 5 is a flowchart of an example method 500 for decrypting secure boot information with at least one cryptographic technique and a specified validation technique. Although execution of method 500 is described below with reference to computing system 395 of FIG. 3, other suitable components for execution of method 500 can be utilized (e.g., IC 100 and computing device 201). Additionally, method 500 may be implemented in the form of executable instructions encoded on a machine-readable storage medium, in the form of electronic circuitry, or a combination thereof.

At 505 of method 500, processor 310 may map a first secure region of external storage (e.g., secure region 157) to a first cryptographic technique in memory management unit 318 of IC 300. In some examples, processor 310 may map or otherwise associate information identifying the first secure region with an address of first cryptographic information 372A in secure storage 370. In such examples, first cryptographic information 372A may include a technique identifier 374A identifying the first cryptographic technique. At 510, processor 310 may map a second secure region of external storage (e.g., alternate region 159) to a second cryptographic technique in memory management unit 318 of IC 300. In some examples, processor 310 may map or otherwise associate information identifying the second secure region with an address of second cryptographic information 372B in secure storage 370. In such examples, second cryptographic information 372B may include a technique identifier 374B identifying the second cryptographic technique.

At 515, memory management unit 318 may, in response to a request from processor 310 to read from the first secure region storing a first portion of secure boot information, configure cryptography module 115 of IC 300 to decrypt information with the first cryptographic technique. In some examples, memory management unit 318 may configure module 115 by providing first cryptographic information 372A to module 115, as described above in relation to FIG. 3, in response to any request to read from the first secure region. In some examples, the first portion of the secure boot information may be a first portion of encrypted secure boot information 156 stored in external storage 155. In such examples, a second portion of secure boot information 156 may be stored in the second secure region of external storage 155 and may be encrypted differently than the first portion of the secure boot information.

At 520, cryptography module 115 may decrypt at least the first portion of the secure boot information with the first cryptographic technique as the secure boot information is read from external storage 155. In some examples, processor 310 may read the first portion of the secure boot information from external storage 155 via cryptography module 115, which may decrypt the first portion of the secure boot information with the first cryptographic technique as it is read from external storage 155. In such examples, memory management unit 318 may configure cryptography module 115 to decrypt information read from the first secure region with the first cryptographic technique (e.g. decryption technique) and any parameters of first cryptographic information 372A, as described above, in response to any request to read from the first secure region.

At 525, memory management unit 318 may, in response to a request from processor 310 to read from the second secure region storing a second portion of secure boot information, configure cryptography module 115 of IC 300 to decrypt information with the second cryptographic technique. In some examples, memory management unit 318 may configure module 115 by providing second cryptographic information 3728 to module 115, as described above in relation to FIG. 3, in response to any request to read from the second secure region. In some examples, the second portion of the secure boot information may be a second portion of encrypted secure boot information 156 stored in external storage 155 encrypted differently than the first portion of the secure boot information.

At 530, cryptography module 115 may decrypt the second portion of the secure boot information with the second cryptographic technique as the second portion of the secure boot information is read from external storage 155. In some examples, processor 310 may read the second portion of the secure boot information from external storage 155 via cryptography module 115, which may decrypt the second portion of the secure boot information with the second cryptographic technique as it is read from external storage 155. In such examples, memory management unit 318 may configure cryptography module 115 to decrypt information read from the second secure region with the second cryptographic technique (e.g., decryption technique) and any parameters of first cryptographic information 372B, as described above, in response to any request to read from the second secure region.

In some examples, the secure boot information may include validation control data, as described above in relation to FIGS. 1-3. At 535, processor 310 may determine what validation technique is specified by the validation control data of the secure boot information. In some examples, the validation control data may include a validation technique identifier, as described above in relation to FIGS. 1 and 2. In such examples, processor 310 may determine, at 535, the validation technique indicated by the validation technique identifier of the validation control data.

If the validation control data specifies an error-detection validation technique, then method 500 may proceed to 540. At 540, processor 310 may determine, with the error-detection validation technique, whether validation data of the secure boot information is consistent with the secure boot information, as described above in relation to FIGS. 1-3. If the validation control data specifies a hashing validation technique, then method 500 may proceed to 545. At 545, processor 310 may determine, with the hashing validation technique, whether validation data of the secure boot information is consistent with the secure boot information, as described above in relation to FIGS. 1-3. If the validation control data specifies a digital signature validation technique, then method 500 may proceed to 550. At 550, processor 310 may determine, with the digital signature validation technique, whether validation data of the secure boot information is consistent with the secure boot information, as described above in relation to FIGS. 1-3.

At 555, processor 310 may execute secure boot instructions of the secure boot information if the validation data is determined, with the specified validation technique, to be consistent with the secure boot information. In some examples, functionalities described herein in relation to FIGS. 4-5 may be provided in combination with functionalities described herein in relation to any of FIGS. 1-3.

What is claimed is:

1. A non-transitory machine-readable storage medium encoded with instructions executable by a processor of an integrated circuit (IC) including a cryptography module, the storage medium comprising:

instructions to retrieve, with the processor, secure boot information including secure boot instructions and validation data for the secure boot information from storage external to the IC, wherein the processor is to retrieve the secure boot information via a cryptography module to decrypt the secure boot information stored in an encrypted format in the external storage;

instructions to determine, with any one of a plurality of different validation techniques, whether the validation data is consistent with the decrypted secure boot information;

instructions to determine which of the plurality of different validation techniques is specified in validation control data of the decrypted secure boot information; and instructions to boot a computing device including the IC with the secure boot instructions if it is determined, with the specified validation technique, that the validation data is consistent with the decrypted secure boot information.

2. The storage medium of claim 1, wherein:

the validation control data includes a validation length; and the instructions to determine whether the validation data is consistent the decrypted secure boot information comprise instructions to derive test data from a portion of the decrypted secure boot information having a length equal to the validation length.

3. The storage medium of claim 2, wherein the validation control data comprises a validation technique identifier specifying one of the plurality of validation techniques and at least one configuration parameter for the specified validation technique.

4. The storage medium of claim 1, wherein the instructions to determine whether the validation data is consistent with the decrypted secure boot information comprise:

instructions to determine, with an error-detection validation technique, whether the validation data is consistent with the decrypted secure boot information;

instructions to determine, with a hashing validation technique, whether the validation data matches the decrypted secure boot information; and instructions to determine, with a digital signature validation technique, whether the validation data matches the decrypted secure boot information.

5. The storage medium of claim 1, wherein the instructions to boot the computing device comprise:

instructions to trigger execution, by the processor, of the secure boot instructions of the decrypted secure boot information stored in internal storage of the IC if the validation data is consistent with the decrypted secure boot information.

6. The storage medium of claim 1, further comprising:

instructions to identify a control data flag, in the decrypted secure boot information, indicating a location of the validation control data in the decrypted secure boot information.

7. The storage medium of claim 1, wherein the instructions to determine the specified validation technique comprise instructions to determine the specified validation technique from validation control data at a constant location within the secure boot information.

8. An integrated circuit (IC) comprising:
a cryptography module;
a memory management unit;
an internal storage encoded with a set of executable internal instructions; and
a processor to execute the instructions in response to a reset request if, at least, a secure state value is stored in an operating state storage of the IC, wherein the internal instructions, when executed, cause the processor to:
associate, in the memory management unit, a secure region of external storage with a first cryptographic technique;
request to read secure boot information from the secure region of the external storage;
determine which of a plurality of different validation techniques is specified in validation control data of secure boot information retrieved from the secure region and decrypted by the cryptography module; and
determine, with the specified validation technique, whether validation data of the decrypted secure boot information is consistent with the decrypted secure boot information;
wherein, in response to the request to read from the secure region, the cryptography module is to decrypt the secure boot information with the first cryptographic technique.

9. The IC of claim 8, wherein the internal instructions, when executed, further cause the processor to:
execute secure boot instructions of the secure boot information in response to determining that the validation data is consistent with the decrypted secure boot information.

10. The IC of claim 8, further comprising:
secure storage to store first cryptographic parameters including at least one of a first cryptographic technique identifier, a first cryptographic key, a first cryptographic mode identifier, and a first operation type identifier;
wherein the memory management unit is to:
retrieve the first cryptographic information from an address associated with the secure region in the memory management unit in response to the request to read from the secure region; and
provide the first cryptographic information to the cryptography module.

11. The IC of claim 10, wherein:
the validation control data includes at least one of an identifier associated with one of the validation techniques, a validation technique parameter, and a validation length; and
the secure storage is to store second cryptographic information associated with an alternative region of the external storage.

12. The IC of claim 8, wherein the internal instructions to determine whether the validation data is consistent with the decrypted secure boot information, when executed, further cause the processor to:
derive test data from the at least a portion of the decrypted secure boot information at least in part with another cryptography module.

13. A method comprising:
mapping, in a memory management unit of an integrated circuit (IC), a first secure region of external storage to a first cryptographic technique;
configuring, in response to a request from the processor to read from the first secure region storing at least a first portion of secure boot information, a cryptography module of the IC to decrypt information with the first cryptographic technique;
decrypting, with the cryptography module, at least the first portion of the secure boot information with the first cryptographic technique as the secure boot information is read from the external storage;
determining, with a first validation technique, whether validation data of the secure boot information is consistent with the secure boot information, if validation control data of the secure boot information specifies the first validation technique;
determining, with a second validation technique, whether the validation data is consistent with the secure boot information, if the validation control data specifies the second validation technique; and
executing, with the processor, secure boot instructions of the secure boot information if the validation data is consistent with the secure boot information.

14. The method of claim 13, further comprising:
mapping, in the memory management unit, a second secure region of external storage to a second cryptographic technique;
configuring the cryptography module to decrypt information with the second cryptographic technique in response to a request from the processor to read from the second secure region storing a second portion of the secure boot information; and
decrypting, with the cryptography module, the second portion of the secure boot information with the second cryptographic technique as the second portion is read from the external storage.

15. The method of claim 14, further comprising:
determining, with a digital signature validation technique, whether the validation data is consistent with the secure boot information, if the validation control data specifies the digital signature validation technique;
wherein the first validation technique is an error-detection validation technique and the second validation technique is a hashing validation technique.

* * * * *